US012225244B2

(12) United States Patent
Diamondstein

(10) Patent No.: US 12,225,244 B2
(45) Date of Patent: *Feb. 11, 2025

(54) METHODS, SYSTEMS AND MEDIA FOR SELECTIVELY PRESENTING BROADCAST CONTENT BASED ON USER INTERESTS

(71) Applicant: Google LLC, Mountain View, CA (US)

(72) Inventor: Andrew Mark Diamondstein, San Francisco, CA (US)

(73) Assignee: GOOGLE LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/233,490

(22) Filed: Aug. 14, 2023

(65) Prior Publication Data

US 2023/0388560 A1    Nov. 30, 2023

Related U.S. Application Data

(63) Continuation of application No. 16/895,380, filed on Jun. 8, 2020, now Pat. No. 11,729,433, which is a (Continued)

(51) Int. Cl.
*H04N 21/2187*    (2011.01)
*H04N 21/2387*    (2011.01)
(Continued)

(52) U.S. Cl.
CPC ..... *H04N 21/2187* (2013.01); *H04N 21/2387* (2013.01); *H04N 21/25891* (2013.01);
(Continued)

(58) Field of Classification Search
CPC ........... H04N 21/2187; H04N 21/2387; H04N 21/25891; H04N 21/26258;
(Continued)

(56) References Cited

U.S. PATENT DOCUMENTS 7,458,093 B2   11/2008   Dukes et al.
7,985,134 B2   7/2011    Ellis
(Continued)

OTHER PUBLICATIONS

Notice of Allowance dated Jan. 31, 2020 in U.S. Appl. No. 16/173,315.
(Continued)

*Primary Examiner* — Mulugeta Mengesha
(74) *Attorney, Agent, or Firm* — Brake Hughes Bellermann LLP

(57) ABSTRACT

Methods, systems, and media for selectively presenting broadcast content based on user interests are provided. In some implementations a method for selectively presenting broadcast content is provided, the method comprising: receiving user information; associating one or more athletes, each on a roster of a team in a sports organization, with the user based on the user information; identifying broadcast programs that a user device can present; determining broadcast programs that depict a game between teams in the sports organization that are relevant to an athlete associated with the user based on program metadata; receiving event metadata for the relevant broadcast programs that is indicative of events in the game depicted therein; determining that a portion of the first broadcast program is relevant to a first entity based on the event metadata; and causing the user device to present the portion of the first broadcast.

17 Claims, 5 Drawing Sheets

Related U.S. Application Data continuation of application No. 16/173,315, filed on Oct. 29, 2018, now Pat. No. 10,681,392, which is a continuation of application No. 15/429,836, filed on Feb. 10, 2017, now Pat. No. 10,116,969, which is a continuation of application No. 14/587,857, filed on Dec. 31, 2014, now Pat. No. 9,571,890.

(51) Int. Cl.
*H04N 21/258* (2011.01)
*H04N 21/262* (2011.01)
*H04N 21/433* (2011.01)
*H04N 21/438* (2011.01)
*H04N 21/45* (2011.01)
*H04N 21/6543* (2011.01)

(52) U.S. Cl.
CPC ... *H04N 21/26258* (2013.01); *H04N 21/4334* (2013.01); *H04N 21/4383* (2013.01); *H04N 21/4532* (2013.01); *H04N 21/6543* (2013.01)

(58) Field of Classification Search
CPC ........... H04N 21/4334; H04N 21/4383; H04N 21/4532; H04N 21/6543
See application file for complete search history.

(56) References Cited

U.S. PATENT DOCUMENTS

| | | | |
|---|---|---|---|
| 8,028,315 | B1 | 9/2011 | Barber |
| 8,702,504 | B1 | 4/2014 | Hughes et al. |
| 8,776,117 | B2 | 7/2014 | Aldrey et al. |
| 9,138,652 | B1 | 9/2015 | Thompson et al. |
| 9,462,346 | B2 * | 10/2016 | Mangat ............... H04N 21/4755 |
| 2004/0064835 | A1 * | 4/2004 | Bellwood ............ H04N 7/0887 348/E7.071 |
| 2008/0062318 | A1 | 3/2008 | Ellis et al. |
| 2008/0271078 | A1 | 10/2008 | Gossweiler et al. |
| 2009/0082110 | A1 * | 3/2009 | Relyea ................... A63F 13/00 463/42 |
| 2014/0018135 | A1 | 1/2014 | Fernandez et al. |
| 2014/0033081 | A1 | 1/2014 | Fernandez et al. |
| 2014/0157307 | A1 | 6/2014 | Cox |
| 2014/0189743 | A1 | 7/2014 | Kennedy et al. |
| 2015/0150045 | A1 | 5/2015 | Shovkoplias |
| 2016/0119262 | A1 * | 4/2016 | Siegel ................. H04L 12/1859 709/206 |
| 2017/0099512 | A1 * | 4/2017 | Osminer ............ H04N 21/8133 |

OTHER PUBLICATIONS

Notice of Allowance dated Mar. 20, 2023 in U.S. Appl. No. 16/895,380.
Notice of Allowance dated Jun. 26, 2018 in U.S. Appl. No. 15/429,836.
Notice of Allowance dated Sep. 30, 2016 in U.S. Appl. No. 14/587,857.
Office Action dated Feb. 14, 2018 in U.S. Appl. No. 15/429,836.
Office Action dated Mar. 11, 2016 in U.S. Appl. No. 14/587,857.
Office Action dated Mar. 23, 2022 in U.S. Appl. No. 16/895,380.
Office Action dated Jul. 27, 2021 in U.S. Appl. No. 16/895,380.
Office Action dated Aug. 9, 2019 in U.S. Appl. No. 16/173,315.
Office Action dated Aug. 14, 2017 in U.S. Appl. No. 15/429,836.
Office Action dated Aug. 24, 2022 in U.S. Appl. No. 16/895,380.
Office Action dated Nov. 29, 2021 in U.S. Appl. No. 16/895,380.

* cited by examiner

METHODS, SYSTEMS AND MEDIA FOR SELECTIVELY PRESENTING BROADCAST CONTENT BASED ON USER INTERESTS

CROSS-REFERENCE TO RELATED APPLICATIONS

This application is a continuation of U.S. patent application Ser. No. 16/895,380, filed Jun. 8, 2020, which is a continuation of U.S. patent application Ser. No. 16/173,315, filed Oct. 29, 2018, which is a continuation of U.S. patent application Ser. No. 15/429,836, filed Feb. 10, 2017, which is a continuation of U.S. patent application Ser. No. 14/587,857, filed Dec. 31, 2014, each of which is hereby incorporated by reference herein in its entirety.

TECHNICAL FIELD

The disclosed subject matter relates to methods, systems, and media for selectively presenting broadcast content based on user interests.

BACKGROUND

Users are often interested in consuming specific portions of programs that are being broadcast, and may not be interested in consuming the other portions of the program. For example, a user may be interested in: a particular baseball player participating in a baseball game that is being broadcast; a particular person being interviewed on a talk show; or a particular topic being discussed in a news program. However, it can be difficult and frustrating for a user to attempt to tune to the broadcast at just the right time. Attempting to do so often requires the user to frequently tune to the broadcast or to manually monitor what is happening in the broadcast from an online source of information about the program. Even when a user is committed to performing these tasks, the user can still miss the portion that the user wanted to see if the user does not tune to the broadcast at the right time, or if the user becomes distracted. Although a service exists, in the form of a channel that broadcasts selected portions of professional football games that are in progress, this service is not based on the interests of a particular user. Consequently, even though the content broadcast on such a channel may be interesting to many users, the channel will often present content that any given user is not interested in, and will often fail to present content that that user is interested in.

Accordingly, methods, systems, and media for selectively presenting broadcast content based on user interests are desirable.

SUMMARY

In accordance with some implementations of the disclosed subject matter, mechanisms for selectively presenting broadcast content based on user interests are provided.

In accordance with some implementations of the disclosed subject matter, a method for selectively presenting broadcast content is provided, the method comprising: receiving, using a hardware processor, user information associated with a user of a user device; associating a plurality of entities with the user based on the user information, wherein each of the plurality of entities corresponds to one or more athletes on a roster of a particular team that is a member of a sports organization; identifying a plurality of broadcast programs that the user device is capable of presenting; determining that each of one or more broadcast programs of the plurality of broadcast programs that the user device is capable of presenting that depict a game between teams that are members of the sports organization is relevant to at least one of the plurality of entities associated with the user based on program metadata for each of the plurality of broadcast programs; receiving event metadata for each of the one or more broadcast programs, wherein event metadata is indicative of events in the game depicted by a particular broadcast program; determining, during a broadcast of a first broadcast program of the plurality of broadcast programs, that a portion of the first broadcast program is relevant to a first entity of the plurality of entities based on the received event metadata indicative of events in the game depicted in the first broadcast program; and in response to determining that the portion of the first broadcast program is relevant to the first entity, causing the user device to present the portion of the first broadcast.

In accordance with some implementations of the disclosed subject matter, a system for selectively presenting broadcast content is provided, the system comprising: a hardware processor that is programmed to: receive user information associated with a user of a user device; associate a plurality of entities with the user based on the user information, wherein each of the plurality of entities corresponds to one or more athletes on a roster of a particular team that is a member of a sports organization; identify a plurality of broadcast programs that the user device is capable of presenting; determine that each of one or more broadcast programs of the plurality of broadcast programs that the user device is capable of presenting that depict a game between teams that are members of the sports organization is relevant to at least one of the plurality of entities associated with the user based on program metadata for each of the plurality of broadcast programs; receive event metadata for each of the one or more broadcast programs, wherein event metadata is indicative of events in the game depicted by a particular broadcast program; determine, during a broadcast of a first broadcast program of the plurality of broadcast programs, that a portion of the first broadcast program is relevant to a first entity of the plurality of entities based on the received event metadata indicative of events in the game depicted in the first broadcast program; and in response to determining that the portion of the first broadcast program is relevant to the first entity, cause the user device to present the portion of the first broadcast.

In accordance with some implementations of the disclosed subject matter, a non-transitory computer-readable medium containing computer executable instructions that, when executed by a processor, cause the processor to perform method for selectively presenting broadcast content is provided, the method comprising: receiving user information associated with a user of a user device; associating a plurality of entities with the user based on the user information, wherein each of the plurality of entities corresponds to one or more athletes on a roster of a particular team that is a member of a sports organization; identifying a plurality of broadcast programs that the user device is capable of presenting; determining that each of one or more broadcast programs of the plurality of broadcast programs that the user device is capable of presenting that depict a game between teams that are members of the sports organization is relevant to at least one of the plurality of entities associated with the user based on program metadata for each of the plurality of broadcast programs; receiving event metadata for each of the one or more broadcast programs, wherein event metadata is indicative of events in the game depicted by a particular broadcast program; determining, during a broadcast of a first broadcast program of the plurality of broadcast programs, that a portion of the first broadcast program is relevant to a first entity of the plurality of entities based on the received event metadata indicative of events in the game depicted in the first broadcast program; and in response to determining that the portion of the first broadcast program is relevant to the first entity, causing the user device to present the portion of the first broadcast.

In accordance with some implementations of the disclosed subject matter, a system for selectively presenting broadcast content is provided, the system comprising: means for receiving user information associated with a user of a user device; means for associating a plurality of entities with the user based on the user information, wherein each of the plurality of entities corresponds to one or more athletes on a roster of a particular team that is a member of a sports organization; means for identifying a plurality of broadcast programs that the user device is capable of presenting; means for determining that each of one or more broadcast programs of the plurality of broadcast programs that the user device is capable of presenting that depict a game between teams that are members of the sports organization is relevant to at least one of the plurality of entities associated with the user based on program metadata for each of the plurality of broadcast programs; means for receiving event metadata for each of the one or more broadcast programs, wherein event metadata is indicative of events in the game depicted by a particular broadcast program; means for determining, during a broadcast of a first broadcast program of the plurality of broadcast programs, that a portion of the first broadcast program is relevant to a first entity of the plurality of entities based on the received event metadata indicative of events in the game depicted in the first broadcast program; and means for causing the user device to present the portion of the first broadcast, where the means for causing is responsive to the means for determining that the portion of the first broadcast program is relevant to the first entity.

In some implementations, the system further comprises means for transmitting instructions to the user device to record at least one of the one or more broadcast programs; and the means for causing the user device to present the portion of the first broadcast comprises means for instructing the user device to play back the portion of the first broadcast from a recording of the first broadcast.

In some implementations, the user information includes information indicating that the user is associated with a fantasy sports team related to the sport organization, and the means for associating the plurality of entities with the user comprises means for associating the players that are on the roster of the fantasy sports team with the user.

In some implementations, the event metadata is metadata describing the course of a baseball game, depicted in the first broadcast program, between two baseball teams that are members of the sports organization; the first entity is a baseball player participating in the baseball game; the means for determining that the portion of the first broadcast program is relevant to the first entity comprises means for determining that the first entity is scheduled to bat in the portion of the broadcast program based on the event metadata; the system further comprises means for determining a time at which the first entity is likely to appear in the program based on the event metadata; and the means for causing the user device to present the portion of the first broadcast comprises means for transmitting, at a time prior to the time when the portion is to be broadcast, instructions to the user device to present the first broadcast program.

In some implementations, the event metadata is metadata describing the course of a game, depicted in the first broadcast program, between two teams that are members of the sports organization; the first entity is a first player participating in the game; the means for determining that the portion of the first broadcast program is relevant to the first entity comprises means for determining that the first entity contributed to a play depicted by the portion of the broadcast program based on the event metadata; the system further comprises means for determining a time in the broadcast corresponding to the play based on the event metadata; and the means for causing the user device to present the portion of the first broadcast comprises means for transmitting instructions to the user device to present the first program from a recording of the first broadcast program recorded by the user device.

In some implementations, the system further comprises: means for determining, during a broadcast of a second broadcast program of the plurality of broadcast programs, that a portion of the second broadcast program is relevant to a second entity of the plurality of entities based on the received event metadata related to the contents of the second broadcast program; means for determining that the portion of the second broadcast program is being broadcast during presentation of the portion of the first broadcast program by the user device; means for queueing the portion the portion of the second broadcast program for presentation after the portion of the first broadcast program, where the means for queueing is responsive to the means for determining that the portion of the second broadcast program is being broadcast during presentation of the portion of the first broadcast program; and means for causing the user device to present the portion of the second broadcast program subsequent to presentation of the first broadcast program.

In some implementations, the system further comprises: means for determining, during a broadcast of a second broadcast program of the plurality of broadcast programs, that a portion of the second broadcast program is relevant to a second entity of the plurality of entities based on the received event metadata related to the contents of the second broadcast program; means for determining that the portion of the first broadcast program and the portion of the second broadcast program are to be placed in a queue for presentation based on the event metadata related to the contents of the first broadcast program and the event metadata related to the contents of the second broadcast program; means for determining a first relevance score for the portion of the first broadcast program based at least in part on the user information and the event metadata related to the contents of the first broadcast program; means for determining a second relevance score for the portion of the second broadcast program based at least in part on the user information and the event metadata related to the contents of the second broadcast program; means for determining an order in which to place the portion of the first broadcast program and the portion of the second broadcast program in the queue based on the first relevance score and the second relevance score, where the means for determining the order is responsive to the means for determining that the portion of the first broadcast program and the portion of the second broadcast program are to be placed in the queue; and the means for causing the user device to present the portion of the first broadcast comprises means for causing the user device to present the portions of the first broadcast program and the second broadcast program based in the queued order.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
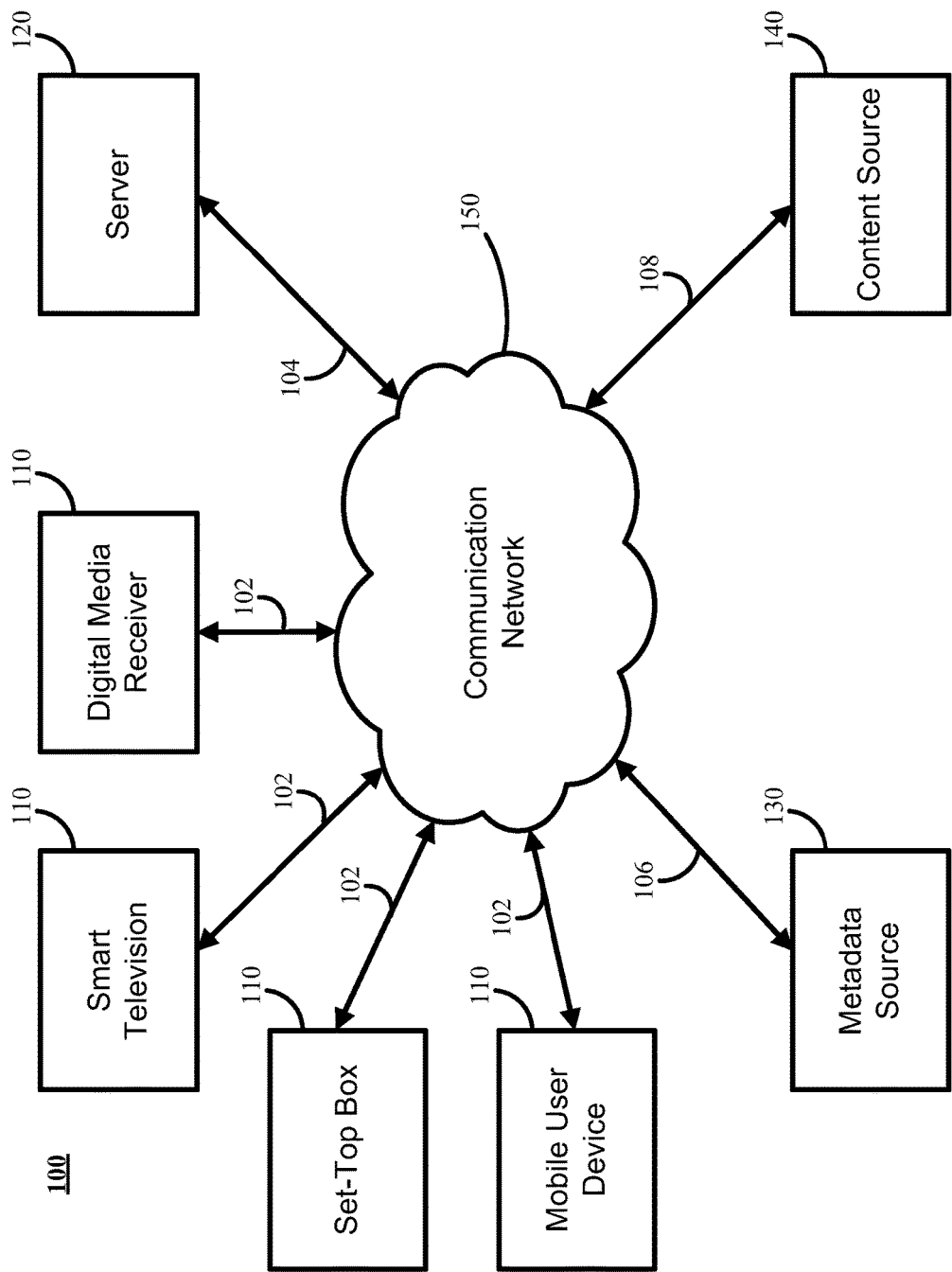
FIG. 1 shows an example of a generalized schematic diagram of a system on which the mechanisms for selectively presenting broadcast content based on user interests as described herein can be implemented in accordance with some implementations.

In accordance with various implementations of the disclosed subject matter, mechanisms (which can include methods, systems and media) for selectively presenting broadcast content based on user interests are provided.

In some implementations, these mechanisms can facilitate the presentation of portions of different broadcasts that are of interest to the user based on those portions being relevant to an entity (e.g., a person, place, topic, etc.) that is of interest to the user. For example, the user may be interested in the performance of several football players (e.g., players associated with a fantasy football team that the user manages) that are playing in professional football games that are being broadcast at the same time. In such an example, the mechanisms described herein can determine which football players the user is interested in (e.g., based on the players being on the fantasy football team), and can determine which broadcasts correspond to the professional football games in which the players are participating. Additionally, in some implementations, based on information provided by the user or a user device associated with the user, the mechanisms described herein can determine which of the broadcasts corresponding to the professional football games are accessible to the user. Note that athletes and/or teams can be members of and/or can be governed by any suitable organization which can be organized in any suitable manner, such as into one or more divisions, leagues, associations, etc. Such an organization can restrict participation to professional athletes or amateur athletes, or may include both professional athletes and amateur athletes. Additionally, such an organization may set rules for participation, schedules of competitions, rules by which the sport is to be played, and/or may govern and/or organize completion in any other suitable ways.

In some implementations, the mechanisms described herein can receive information related to the content of the broadcasts (e.g., event metadata), and can use this information to determine which portion or portions of a particular broadcast are relevant to an entity associated with the user.

Continuing the example where the user is interested in football players on the user's fantasy football team, the mechanisms can receive information related to events that are taking place in the football games depicted in the different broadcasts. Using this information, the mechanisms can determine which portions of the different broadcasts are relevant to the user based on a player that the user is interested in performing an action during that portion of the broadcast (e.g., catching a pass, throwing a touchdown, etc.).

In some implementations, the mechanisms described herein can, in response to determining that a particular portion of a broadcast is relevant to the user, cause a user device associated with the user to present that particular portion to the user. For example, upon determining that a football player on the user's fantasy football team completed a touchdown pass in a portion of a broadcast corresponding to a football game in which the player is participating, the mechanisms can cause a set-top box that recorded that portion of the football game (e.g., in response to instruction sent by the mechanisms to record the football game such that individual portions can be presented to the user) to present that portion by specifying the time period within the recording that is to be presented to the user.

In some implementations, where the mechanisms described herein determine that portions of multiple programs that are broadcast closely in time are all relevant to a user, the mechanisms can cause the portions to be queued for presentation to the user. For example, the mechanisms described herein can determine that portions of multiple football games that were all broadcast around the same time are all relevant to the user. In response to this determination, the mechanisms can instruct a user device associated with the user to present the portions as a queue of audio and/or video clips which are ranked and/or ordered based on the user's interests, the user's preferences and/or other considerations (e.g., based on timing information). This can allow the user to view portions from different broadcasts that have been determined to be of interest specifically to the user and which are all being broadcast substantially simultaneously, in close proximity in time to when the portions of the programs took place and/or were initially broadcast.

FIG. 1 shows an example 100 of a generalized schematic diagram of a system on which the mechanisms for selectively presenting broadcast content based on user interests as described herein can be implemented in accordance with some implementations. As illustrated, system 100 can include one or more user devices 110. User devices 110 can be local to each other or remote from each other. User devices 110 can be connected by one or more communications links 102 to a communication network 150 that can be linked to a server 120 via a communications link 104.

System 100 can include one or more servers 120. Server 120 can be any suitable server or servers for providing copies of and/or access to the mechanisms described herein for selectively presenting broadcast content based on user interests, such as a processor, a computer, a data processing device, or any suitable combination of such devices. For example, the mechanisms for selectively presenting broadcast content based on user interests can be distributed into multiple backend components and multiple frontend components and/or user interfaces. In a more particular example, backend components, such as mechanisms for determining entities associated with a user, determining programs that include content that is relevant to an entity, determining whether a portion of a program includes the content that is relevant to the entity, and causing the portion of the content to be presented by a user device, etc., can be performed on one or more servers 120. In another particular example, frontend components, such as presentation of content, recording content, receiving content from a content source, etc., can be performed on one or more user devices 110.

System 100 can include one or more metadata sources 130. Metadata source 130 can be any suitable computing device that provides metadata (such as a server or other suitable device) such as a processor, a computer, a data processing device, or any suitable combination of such devices. For example, the metadata can be available from a broadcast audio and/or video provider (e.g., a cable television provider, an over-the-air television provider, a satellite television provider, audio and/or video signals provided by another broadcast source such as a telephone or Internet service company, audio and/or video signals available over the Internet from an Internet-based source of broadcast audio and/or video content, a satellite radio provider, a terrestrial radio provider, etc.). As another example, the metadata can be available from a third party that is not a provider of broadcast audio and/or video, but provide metadata related to programs that are broadcast. As yet another example, the metadata can be related to an event (e.g., a sporting event, a concert, a new program, a variety show, etc.) that is being broadcast and can be provided by a party that disseminates metadata related to the event.

System 100 can include one or more content sources 140. Content source 140 can be any suitable source of broadcast content such as a cable television provider, an over-the-air television provider, a satellite television provider, audio and/or video signals provided by another broadcast source such as a telephone or internet service company, an Internet-based source of broadcast content, a satellite radio provider, a terrestrial radio provider, and/or any other suitable source of content. In some implementations, system 100 can include multiple different types of sources of content that may be accessible to one or more of user devices 110. For example, a smart television 110, a mobile user device 110 and/or a digital media receiver 110 may be able to access audio and/or video content that is available from an Internet-based source of broadcast audio and/or video content. As another example, smart television 110 may be able to access audio and/or video content that is broadcast by one or more over-the-air television providers. As yet another example, smart television 110 and/or set-top box 110 may be able to access audio and/or video content that is broadcast by one or more cable or satellite television providers.

In some implementations, each of user devices 110, servers 120, metadata servers 130 and/or content sources 140 can be any of a general purpose device such as a computer or a special purpose device such as a client, a server, a communications satellite, a terrestrial broadcast transmitter and/or antenna, television distribution facility, cable television headend, on-demand server, etc. Any of these general or special purpose devices can include any suitable components such as a hardware processor (which can be a microprocessor, digital signal processor, a controller, etc.), memory, communication interfaces, display controllers, input devices, transmitters, etc. For example, user device 110 can be implemented as a smart television, a set-top box, a digital media receiver, a media streaming device, a game console, a television, a projector, a smartphone, a tablet computer, a wearable computer, a laptop computer, a desktop computer, a portable game console, a vehicle computing and/or entertainment system (e.g., as used in a car, a boat, an airplane, or any other suitable vehicle, and which can include a terrestrial and/or satellite radio), any other suitable computing device, or any suitable combination thereof.

Communications network 106 can be any suitable computer network or combination of such networks including the Internet, an intranet, a wide-area network (WAN), a local-area network (LAN), a wireless network, a Wi-Fi network, a digital subscriber line (DSL) network, a frame relay network, an asynchronous transfer mode (ATM) network, a virtual private network (VPN), an intranet, one or more peer-to-peer connections, etc. Each of communications links 102, 104, 106 and 108 can be any communications links suitable for communicating data among user devices 110, server 120, metadata source 130 and content source 140 such as network links, dial-up links, wireless links, hardwired links, any other suitable communications links, or any suitable combination of such links. Note that, in some implementations, multiple servers 120 can be used to provide access to different mechanisms associated with the mechanisms described herein for selectively presenting broadcast content based on user interests. For example, system 100 can include a user preferences server 120 that stores user preferences associated with one or more users and/or one or more user devices 110, and a content selection server 120 that determines which content to cause to be presented, recorded and/or queued by a particular user device 110 based on the user preferences of users and/or user devices 110 associated with a user, and/or any other suitable servers for performing any suitable functions of the mechanisms described herein.

Figure 2:
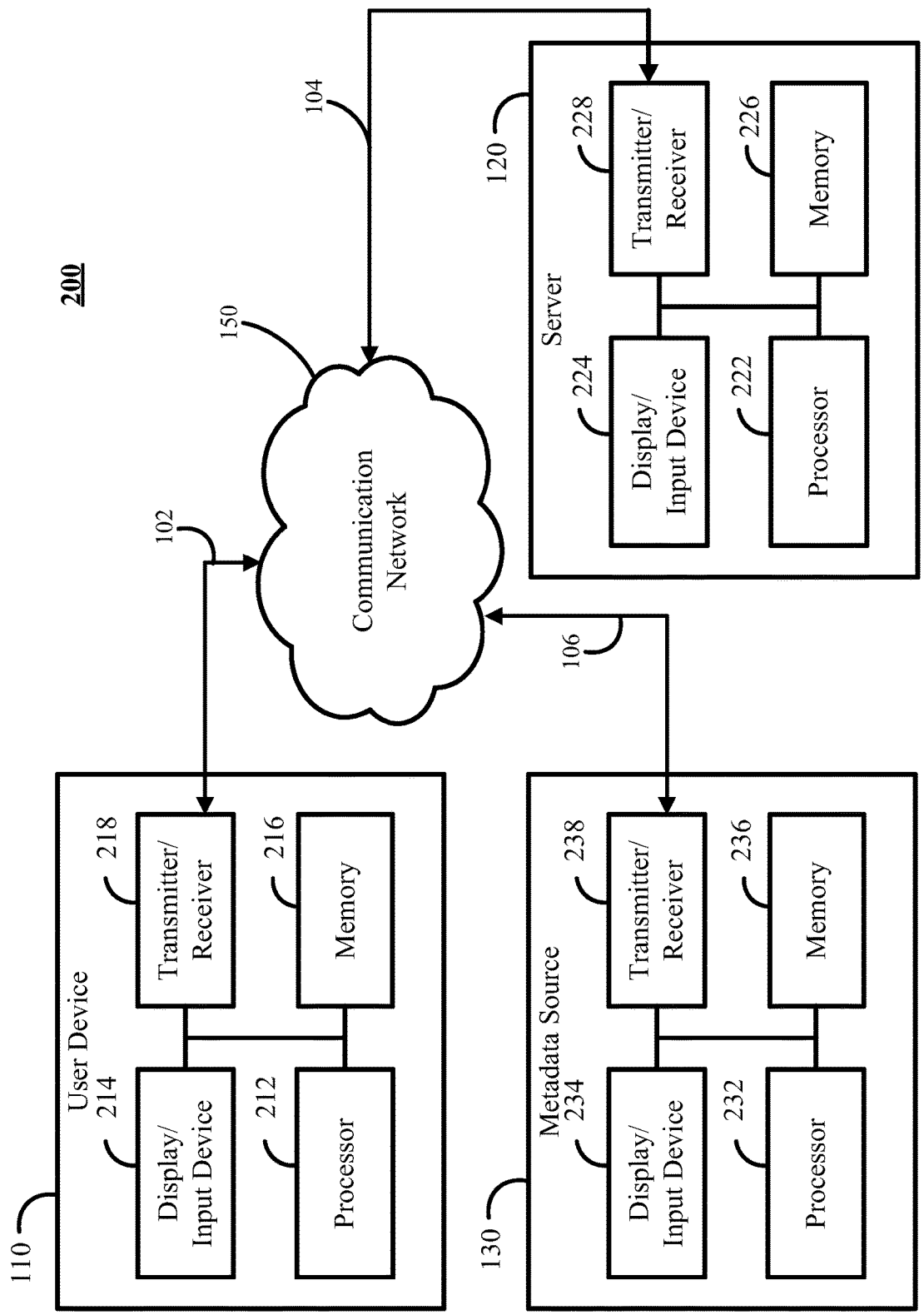
FIG. 2 shows an example of hardware that can be used to implement one or more of the user devices, servers and metadata sources depicted in FIG. 1 in accordance with some implementations of the disclosed subject matter.

FIG. 2 shows an example 200 of hardware that can be used to implement one or more of user devices 110, servers 120 and metadata sources 130 depicted in FIG. 1 in accordance with some implementations of the disclosed subject matter. Referring to FIG. 2, user device 110 can include a hardware processor 212, a display/input device 214, memory 216 and a transmitter/receiver 218, which can be interconnected. In some implementations, memory 216 can include a storage device (such as a computer-readable medium) for storing a user device program for controlling hardware processor 212.

Hardware processor 212 can use the user device program to execute and/or interact with the mechanisms described herein for selectively presenting broadcast content based on user interests, controlling presentation of the content by user device 110 (and/or another user device), setting user preferences, etc. In some implementations, the user device program can cause hardware processor 212 to, for example, interact with another user device and/or a device executing at least a portion of processes 300 and/or 400 as described below in connection with FIGS. 3 and 4, respectively. In some implementations, hardware processor 212 can send and receive data through communications link 102 or any other communication links using, for example, a transmitter, a receiver, a transmitter/receiver, a transceiver, or any other suitable communication device, such as transmitter/receiver 218. Display/input device 214 can include a touchscreen, a flat panel display, a cathode ray tube display, a projector, a speaker or speakers, and/or any other suitable display and/or presentation devices, and/or can include a computer keyboard, a computer mouse, one or more physical buttons, a microphone, a touchpad, a voice recognition circuit, a touch interface of a touchscreen, a camera, a motion sensor such as an optical motion sensor and/or an accelerometer, a near field communication sensor, a biometric data sensor, and/or any other suitable input device. Transmitter/receiver 218 can include any suitable transmitter and/or receiver for transmitting and/or receiving, among other things, audio and/or video signals, a request for a server to send instructions to selectively present broadcast content based on user interests, instructions for recording content, instructions for presenting content, instructions for setting user interests, etc., and can include any suitable hardware, firmware and/or software for interfacing with one or more communication networks, such as network 150 shown in FIG. 1. For example, transmitter/receiver 218 can include network interface card circuitry, wireless communication circuitry, and/or any other suitable type of communication network circuitry, one or more antennas, and/or any other suitable hardware, firmware and/or software for transmitting and/or receiving signals. In some implementations, user device 110 can include circuitry for encoding and/or decoding a signal received by transmitter/receiver 218 into a form suitable for presentation by display/input device 214 and/or any other suitable display device. For example, user device 110 can include circuitry for converting a signal received from an over-the-air broadcaster into a signal (e.g., an MPEG signal) suitable for presentation by display/input device 214 or a display of another user device that is coupled to user device 110.

Server 120 can include a hardware processor 222, a display/input device 224, memory 226 and a transmitter/receiver 228, which can be interconnected. In some implementations, memory 228 can include a storage device for storing data received through communications link 104 or through other links. The storage device can further include a server program for controlling hardware processor 222. In some implementations, memory 228 can include information stored as a result of user activity and/or activity by a user device (e.g., user interests, user identifying information, requests for content to be presented, user information for use in determining content that a user has access to, etc.). In some implementations, the server program can cause hardware processor 222 to, for example, execute at least a portion of processes 300 and/or 400 as described below in connection with FIGS. 3 and 4, respectively.

Hardware processor 222 can use the server program to communicate with user devices 110 and/or metadata sources 130 as well as provide access to and/or copies of the mechanisms described herein. It should also be noted that data received through communications link 104 or any other communications links can be received from any suitable source. In some implementations, hardware processor 222 can send and receive data through communications link 104 or any other communication links using, for example, a transmitter, a receiver, a transmitter/receiver, a transceiver, or any other suitable communication device, such as transmitter/receiver 228. In some implementations, hardware processor 222 can receive commands and/or values transmitted by one or more user devices 110, one or more other servers 120, one or more metadata sources 130 and/or one or more users of server 120, such as a user that makes changes to adjust settings associated with the mechanisms described herein for selectively presenting broadcast content based on user interests. Display 224 can include a touchscreen, a flat panel display, a cathode ray tube display, a projector, a speaker or speakers, and/or any other suitable display and/or presentation devices, and/or can include a computer keyboard, a computer mouse, one or more physical buttons, a microphone, a touchpad, a voice recognition circuit, a touch interface of a touchscreen, a camera, a motion sensor such as an optical motion sensor and/or an accelerometer, a temperature sensor, a near field communication sensor, a biometric data sensor, and/or any other suitable input device. Transmitter/receiver 228 can include any suitable transmitter and/or receiver for transmitting and/or receiving, among other things, requests to cause content to be selectively presented, user interests, user identifying information, user information, etc., and can include any suitable hardware, firmware and/or software for interfacing with one or more communication networks, such as network 150 shown in FIG. 1. For example, transmitter/receiver 228 can include network interface card circuitry, wireless communication circuitry, and/or any other suitable type of communication network circuitry, one or more antennas, and/or any other suitable hardware, firmware and/or software for transmitting and/or receiving signals.

In some implementations, server 120 can be implemented in one server or can be distributed as any suitable number of servers. For example, multiple servers 120 can be implemented in various locations to increase reliability and/or increase the speed at which the server can communicate with user devices 110 and/or metadata sources 130. Additionally or alternatively, as described above in connection with FIG. 1, multiple servers 120 can be implemented to perform different tasks associated with the mechanisms described herein.

Metadata source 130 can include a hardware processor 232, a display/input device 234, memory 236 and a transmitter/receiver 238, which can be interconnected. In some implementations, memory 238 can include a storage device for storing data received through communications link 106 or through other links. The storage device can further include a metadata source program for controlling hardware processor 232. In some implementations, memory 238 can include information stored as a result of user activity and/or received from a primary, secondary and/or other source of metadata (e.g., metadata from a distributor of a program, metadata from an independent source of metadata about one or more programs, metadata about events that occur in a program generated while the program is taking place, etc.).

Hardware processor 232 can use the metadata source program to communicate with user devices 110 and/or server 120. It should also be noted that data received through communications link 106 or any other communications links can be received from any suitable source. In some implementations, hardware processor 232 can send and receive data through communications link 106 or any other communication links using, for example, a transmitter, a receiver, a transmitter/receiver, a transceiver, or any other suitable communication device, such as transmitter/receiver 238. In some implementations, hardware processor 232 can receive commands and/or values transmitted by one or more user devices 110, servers 120, other metadata sources 130, content sources 140, and/or one or more users of metadata source 130, such as a user that makes changes to adjust settings associated with metadata source 130. Display 234 can include a touchscreen, a flat panel display, a cathode ray tube display, a projector, a speaker or speakers, and/or any other suitable display and/or presentation devices, and/or can include a computer keyboard, a computer mouse, one or more physical buttons, a microphone, a touchpad, a voice recognition circuit, a touch interface of a touchscreen, a camera, a motion sensor such as an optical motion sensor and/or an accelerometer, a temperature sensor, a near field communication sensor, a biometric data sensor, and/or any other suitable input device. Transmitter/receiver 238 can include any suitable transmitter and/or receiver for transmitting and/or receiving, among other things, metadata related to one or more programs and information identifying the program to which the metadata is related, and can include any suitable hardware, firmware and/or software for interfacing with one or more communication networks, such as network 150 shown in FIG. 1. For example, transmitter/receiver 238 can include network interface card circuitry, wireless communication circuitry, and/or any other suitable type of communication network circuitry, one or more antennas, and/or any other suitable hardware, firmware and/or software for transmitting and/or receiving signals.

In some implementations, metadata source 130 can be implemented in a computing device (e.g., a server) or can be distributed as any suitable number of computing devices. For example, multiple metadata sources 130 can be implemented in various locations to increase reliability and/or increase the speed at which the metadata source can communicate with user devices 110, server 120 and/or content sources 140. Additionally or alternatively, multiple metadata sources 130 can be implemented to provide metadata related to different programs (e.g., from different sources) and/or different types of metadata (e.g., program metadata, event metadata, etc.).

Figure 3:
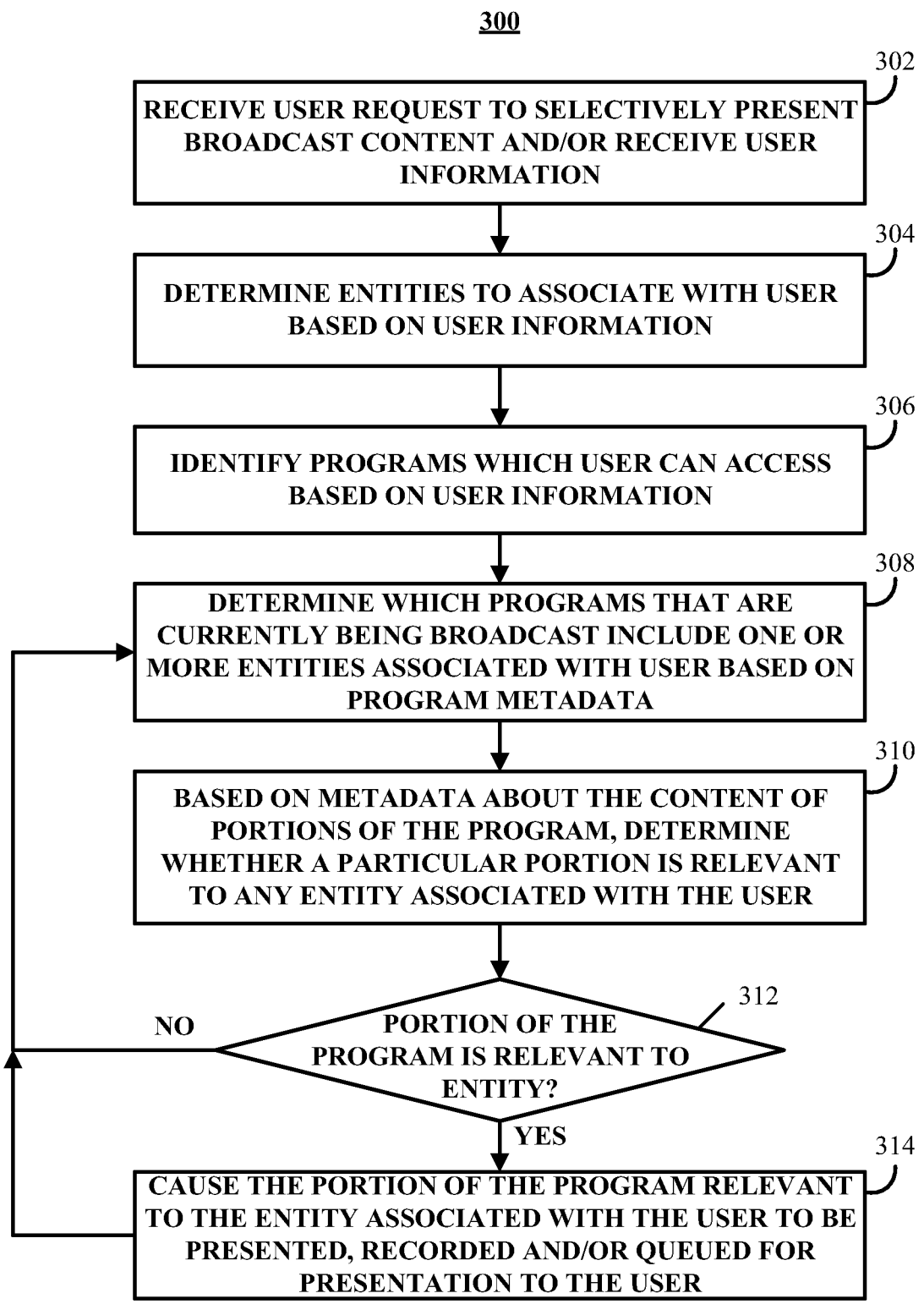
FIG. 3 shows an example of a process for selectively presenting broadcast content based on user interests in accordance with some implementations of the disclosed subject matter.

FIG. 3 shows an example 300 of a process for selectively presenting broadcast content based on user interests in accordance with some implementations of the disclosed subject matter. As shown in FIG. 3, at 302, process 300 can receive a request to selectively present broadcast content and/or can receive user information associated with the user. Such a request can be communicated using any suitable technique or combination of techniques. Additionally, such a request can be communicated in any suitable format from any suitable user device 110, which may or may not be a user device that is to be used to receive and/or present the content.

In some implementations, such a request can be communicated from a user device in response to any suitable action being performed by the user device. For example, such a request can be communicated from a user device (e.g., a personal computer, a smart television, a set-top box, a game console, a mobile computing device, etc.) that is presenting a web page that includes a user interface for requesting that the mechanisms described herein selectively present broadcast content based on user interests using a user device which may or may not be the same user device that was used to communicate the request. In such an example, any suitable technique can be used to identify a user device that is to present the content as a target for instructions associated with selectively presenting broadcast content based on user interests.

As another example, such a request can be communicated from a user device in response to the user device executing an application for selectively presenting broadcast content based on user interests and/or receiving input to such an application. As yet another example, such a request can be communicated from a user device in response to the user device being used to present content. As still another example, such a request can be communicated from a user device in response to the user device receiving input to request selective presentation of broadcast content based on user interests (e.g., in a user interface of a user device used for presenting content such as an electronic program guide or other menu of a set-top box).

In some implementations, user information can include any suitable information that can be used to determine broadcast content that the user can access. For example, user information can include information for identifying the user, which can be used to retrieve previously determined information about broadcast sources that the user can access (e.g., from a database). As another example, user information can include username and password information for an account associated with the mechanisms described herein for selectively presenting broadcast content based on user interests and/or for one or more accounts associated with a service that provides broadcast content. As yet another example, user information can include information related to a location associated with the user (e.g., a city, state, zip code, etc.), a provider from which a user device associated with the user receives content, and/or one or more broadcast services available from a content provider to which the user subscribes (e.g., a service that allows the user to access sporting events that are not broadcast locally in the user's area, a service that allows the user to access premium content that is not otherwise included in a basic package of content provided to the user, etc.). As still another example, user information can include information that allows process 300 to access account information for a service provider account to gather information on sources of broadcast content accessible by the user. As described below in connection with 306 of FIG. 3, process 300 (and/or any other suitable process) can utilize such user information to identify programs included in broadcast content that the user can access.

In some implementations, user information can include any suitable information that can be used to identify the user's interests and/or identify user devices associated with the user. For example, user information can include information for identifying the user, which can be used to retrieve previously determined user interests of the user (e.g., from a database). As another example, user information can include username and password information for an account associated with the mechanisms described herein for selectively presenting broadcast content based on user interests and/or for one or more accounts associated with entities in which the user is interested (e.g., a fantasy sports account, a social networking account, etc.). As yet another example, user information can include information specified by input from a user that explicitly identifies one or more entities in which the user is interested in. In some implementations, process 300 can at regular and/or irregular time intervals, receive and/or determine updated and/or altered user information.

At 304, process 300 can determine one or more entities that are to be associated with the user based on the user information. In some implementations, entities can include any suitable people, places, things, topics, concepts, etc. For example, an entity can be a person such as an athlete, an author, an actor, a politician, a fictional character, etc. As another example, an entity can be a group of people such as a sports team, a portion of a sports team, a cast of characters, a cast of actors, etc. As yet another example, an entity can be a topic or thing, such as a movie, a news story, a company, a product, a keyword or group of keywords, etc., that is not a person or group of people. As still another example, an entity can be a concept, such as "good news" or "positive" content (e.g., news or current events that are upbeat or related to a story that would generally be perceived as positive), "negative" content, and/or any other suitable concept that is related to the content in a broadcast.

In some implementations, process 300 can determine user interest in one or more entities without the user input specifically identifying the entities in which the user is interested. For example, as described above, the user information can include information that can be used by process 300 to access information related to a fantasy sports account associated with the user. In such an example, process 300 can identify players, teams, units of a team (e.g., a team's defense) etc., that are associated with the fantasy sports account and can identify those entities as entities in which the user is interested. As another example, the user information can include information that can be used by process 300 to access information related to a social networking account associated with the user. In such an example, process 300 can identify user interests based on activity and/or information associated with the user's social networking account.

Additionally or alternatively, in some implementations, a user can specify (e.g., using a user interface associated with the mechanisms described herein for selectively presenting broadcast content based on user interests) one or more entities that the user is interested in explicitly. For example, a user can specify one or more players of a particular sport that the user is interested in. As another example, a user can specify one or more actors that the user is interested in. In some implementations, such explicitly identified user interests can be stored by any suitable device (e.g., server 120 and/or user device 110) and can be updated based on further user input and/or based on user interests identified without user input.

At 306, process 300 can identify one or more programs that are available for consumption by the user based on the user information received at 302. In some implementations, process 300 can use any suitable technique of combination of techniques to identify the one or more programs. For example, based on user information such as a provider of a broadcast television service, a subscription package from the broadcast television service (if any) and a user's location (e.g., specified as a city, state, zip code, etc.), process 300 can identify which sources of content the user has access to (e.g., television channels), and identify programs that are available based on those sources. As another example, based on user information indicating that the user subscribes to an Internet-based service that allows the user to access all professional baseball games that are being broadcast (which may be subject to local blackout rules), process 300 can identify the programs depicting professional baseball games as programs that are available to the user. As yet another example, based on user information indicating that the user has a particular application installed on a user device and/or that the user subscribes to and/or has access to a particular Internet-based broadcasting service, process 300 can identify content that is broadcast by the broadcasting service as programs that are available to the user.

In some implementations, process 300 can request and/or receive metadata (e.g., from one or more metadata sources 130) related to sources of content that the user can access. In such implementations, process 300 can identify programs that are available to the user based on the program metadata. For example, process 300 can receive metadata for one or more television channels that the user can access via user device 110, such as a television and/or a set-top box. In such an example, process 300 can receive the metadata from the same metadata source 130 that provides metadata to user device 110 and/or from another metadata source 130 which may be unaffiliated with a television provider that the user receives content from.

At 308, process 300 can determine programs that are currently being broadcast and/or are scheduled to be broadcast in the future that are relevant to one or more entities associated with the user based on metadata about the programs. Process 300 can use any suitable technique or combination of techniques to compare entities associated with the user and metadata about the programs that are currently being broadcast and/or are scheduled to be broadcast in the future. For example, in some implementations, process 300 can determine, based on the metadata associated with the programs that the user has access to and based on the entities associated with the user, whether any entity associated with the user is included (and/or likely to be included) in the content of the program.

In some implementations, process 300 can compare program metadata for programs that are currently being broadcast and/or are scheduled to be broadcast in the future to entities associated with the user. For example, in the case of a baseball game, process 300 can determine from the metadata associated with the program depicting the baseball game that two teams are participating in the game. In such an example, process 300 can determine whether an entity associated with the user is a baseball player that is scheduled to participate in the game and/or is on the roster of one of the two teams. If an entity is a baseball player that is scheduled to participate in the game and/or is on the roster of one of the two teams, process 300 can identify the baseball game as a program that is relevant to one or more entities associated with the user.

In some implementations, process 300 can compare the entities associated with the user to metadata for programs that are currently being broadcast and/or are scheduled to be broadcast in the future. For example, in the case of an entity that is a baseball player, process 300 can determine whether the team for which the player plays is participating in a game that corresponds to one of the programs that is currently being broadcast and/or is scheduled to be broadcast in the future.

In some implementations, process 300 can determine whether any suitable programs are relevant for any period into the future. For example, programs that are scheduled to be broadcast in the future that are considered by process 300 can include programs that are scheduled to be broadcast within an hour of receiving the request at 302, within two hours, within twelve hours, within a day, etc.

In some implementations, process 300 can cause instructions to be transmitted to a user device 110 to record the programs that are determined to be relevant to one or more entities associated with the user. For example, process 300 can cause instructions to be transmitted to a set-top box 110 that is configured as a digital video recorder to record certain programs. As another example, process 300 can cause instructions to be transmitted to a mobile user device 110 (e.g., a smartphone, a tablet computer, etc.) that can record the programs based on the instructions and/or can cause another user device 110 to record the programs. Such recorded programs can be programs available from any suitable content source such as a cable television provider, an over-the-air television provider, an Internet-based content provider, etc.

In some implementations, process 300 can use the entities associated with the user to search for broadcast programs that include metadata relevant to the user. Process 300 can use any suitable technique or combination of techniques to search for such broadcast programs. For example, process 300 can use the entities and/or related terms as keywords for a search for programs that are associated with metadata that includes information related to the entities. In a more particular example, process 300 can submit the keywords to a server that maintains a database of metadata about upcoming broadcasts, and can receive the metadata and/or identifying information of the programs that include metadata related to the keywords. Process 300 can then use this metadata in determine which programs are relevant to the entities associated with the user at 308.

In some implementations, process 300 can determine that there are programs that are currently being broadcast that are relevant to an entity associated with the user, but that are not among the programs identified at 306 as a program that the user can access. In such implementations, process 300 can inform a user that such a program exists and can present the user with one or more options for accessing the program. Process 300 can use any suitable technique or combination of techniques to inform the user and/or present the user with the one or more options. For example, process 300 can cause a message to be presented by the user device. As another example, process 300 can cause a message to be presented to the user through a messaging service (e.g., email, a social networking service, as a text message, etc.).

At 310, process 300 can determine whether, for a program that was determined to be relevant to an entity associated with the user, the content of a particular portion of the program is relevant to an entity associated with the user based on metadata about the content of portions of the program. Process 300 can use any suitable technique or combination of techniques to determine whether the content of a particular portion of the program is relevant to the entity associated with the user. For example, process 300 can receive event metadata about the contents of portions of the program. In such an example, the event metadata can include information related to which entities were relevant to any particular portion of a program and/or to any particular portion of an event which the program is intended to depict. In a more particular example, if a particular program is a sporting event such as a baseball game where events can be predicted to an extent based on known information about the participants and past events (e.g., based on the lineup and the fact that there are no outs, process 300 can predict that a player that is in the lineup after the current batter will come up to bat at the conclusion of the current at-bat), the event metadata can include information describing the events that have taken place in the baseball game and/or events that are scheduled to take place in the baseball game. This descriptive information can be time stamped and/or otherwise tied to the actual course of the baseball game. Such event metadata of a baseball game can indicate the outcome of a particular at-bat, a player or players that participated in a given play, identifying information of a pitcher and/or batter involved in a particular at-bat, etc. These events can be associated with descriptive information and/or timing information that identifies when the events occurred with respect to other events that took place and/or are scheduled to take place during the game. In some implementations, in cases where an upcoming portion is expected to be relevant to an entity associated with the user, process 300 can include part of the broadcast that precedes the portion which can be included such that a user is less likely to miss the relevant portion because of a possible time delay between when the program is broadcast and when the event metadata describing the events in the program is received by process 300.

As another more particular example, if a particular program is a sporting event such as a basketball or football game where future events are more difficult to predict based on known information about the participants and past events (e.g., in such a sporting event players that are participating in the game may or may not make a meaningful contribution to any given play), the event metadata can include information describing the events that have taken place in the game. This descriptive information can be time stamped and/or otherwise tied to the actual course of the game. Such event metadata of a football or basketball game can indicate the outcome of a particular play, players that contributed to the play (e.g., by scoring points, gaining yards, completing a catch, being credited with an assist, scoring a basket, etc.), etc.

In some implementations, process 300 can use the event metadata to determine whether a portion of content that is about to be broadcast is likely to be relevant to the user. For example, based on event metadata indicating that a baseball player entity associated with the user is coming up to bat in a baseball game, process 300 can determine that the upcoming portion of a program that is being broadcast depicting the baseball game is a relevant portion of video for the user.

Additionally or alternatively, in some implementations, process 300 can use the event metadata to determine whether a portion of content that has recently been broadcast is likely to be relevant to the user. For example, based on event metadata indicating that a football player entity associated with the user scored a touchdown in a recent play in a football game, process 300 can determine that the portion of a program that is being broadcast depicting the football game that corresponds to the recent play is a relevant portion of video for the user. As another example, the event metadata can include closed-captioning information for a program, and process 300 can evaluate the closed captioning information as the information is broadcast (and/or after the information is broadcast) to determine whether a particular portion is relevant to an entity associated with the user.

In some implementations, process 300 can use any suitable technique or combination of techniques to determine which portion of a program that is being broadcast, has been broadcast and/or is scheduled to be broadcast corresponds to the portion of the program that process 300 has determined is relevant to the user. For example, if process 300 determines that a particular play of a football game is relevant to the user because a football player entity associated with the user scored a touchdown on the play, process 300 can determine which portion of the program corresponds to that particular play using any suitable technique or combination of techniques. In some implementations, if the event metadata is time-stamped based on the broadcast of the program depicting the football game (e.g., the particular play started at a particular real-world time and/or ended at another particular real-world time, the particular play started at a particular time into the broadcast and/or ended at another particular time into the broadcast, etc.), process 300 can determine a portion of a recording of the program that corresponds to the play based on a comparison of the time-stamp(s) and the time when the recording was originally broadcast. Additionally or alternatively, if the event metadata is time-stamped based on game time (e.g., how much time was remaining/elapsed on a game clock when the play started and/or ended), process 300 can determine a portion of a recording of the program that corresponds to the play by determining (e.g., based on image analysis of a broadcast of the program) which portion of the recording includes image data corresponding to the time indicated in the metadata to correspond to the play. In a more particular example, many broadcasts of time-based sporting events (e.g., football, basketball, soccer, hockey, etc.) include a graphic overlay that presents users with a representation of how much time has elapsed and/or remains in a particular portion of the game, which portion of the game is currently happening (e.g., first quarter, second half, third period, overtime, etc.). In such an example, process 300 can determine a game time that a particular portion of a broadcast corresponds to by determining the contents of the graphic (e.g., how much time is on the game clock and a portion of the game that is being depicted) using one or more image analysis techniques. In some implementations, process 300 can use one or more image analysis techniques to determine that a portion of a program is relevant to an entity associated with the user. For example, in cases such as interviews on news programs and individual sports, such as golf, a broadcast of the content may include an on-screen caption which displays information related to the content of the program such as a name of an individual that is included in the broadcast. In such an example, process 300 (and/or any other suitable process) can analyze image information from the broadcast program and determine the content of the on-screen caption to determine that the portion of the program including the on-screen caption pertains to a particular entity associated with the user. Additionally, in some implementations, process 300 can correlate information generated based on image analysis with, for example, closed caption data to determine whether the information generated from the image information is correlated with the content of the closed-captioning data.

Additionally, in some implementations, process 300 can use any suitable technique or combination of techniques to determine when the program is no longer relevant to the user. In some implementations, having determined that a particular portion of a program is relevant to the user, process 300 can determine when that program is no longer relevant to the user, and thus determine an end point for the portion. For example, based on the event metadata about the entity associated with the user, process 300 can determine that the program is no longer relevant to that entity. In a more particular example, in the case of a baseball game, process 300 can determine that an upcoming portion of a program depicting a baseball game is relevant to a user, because process 300 has determined (e.g., based on event metadata for the baseball game) a baseball player on the user's fantasy baseball team is coming up to bat. In such an example, process 300 can determine that the program is no longer relevant based on information indicating that the baseball player recorded an out, based on information indicating that the inning is over, based on the player scoring a run, etc.

As another example, based on program metadata, process 300 can determine when a particular portion of a program that is relevant to the entity associated with the user is over. In such an example, the program metadata can include timing information indicating which entities are relevant to particular portions, and process 300 can use this timing information to determine a beginning for the portion and/or an end for the portion.

As yet another example, process 300 can include any suitable amount of content in the portion of the program (e.g., as described with reference to the examples herein, and/or using any other suitable technique or combination of techniques), and allow a user to end the portion based on user input (e.g., using a remote control associated with user device 110 that is presenting the portion of the program, by providing input to a user interface of a user device 110 that is presenting the portion of the program and/or to a user interface of any other user device 110 associated with the user). In a more particular example, during presentation of the portion of the program to the user (e.g., as described below in connection with 310), the user can end the portion at any suitable time (e.g.: by skipping to a next portion in a queue; by changing a channel that is being presented by the user device presenting the content; by providing input using a "previous" user input, a "back" user input, a "stop" user input, etc., associated with the user device; and/or using any other suitable technique or combination of techniques).

If no portion of a program determined to be relevant to the user at 308 is relevant to an entity associated with the user ("NO" at 312), process 300 can return to 308 and can continue to determine which programs that are being/are scheduled to be broadcast are relevant to the user and/or determining whether one or more portions of such programs are relevant to a particular entity at 310.

Otherwise, if a portion of a program is relevant to an entity associated with the user ("YES" at 312), process 300 can proceed to 314. At 314, process 300 can cause the portion of a program that is relevant to the entity to be presented to the user, to be recorded for possible presentation to a user and/or queued for presentation to the user with one or more other portions of programs that have been determined to be relevant to the user.

In some implementations, process 300 can use any suitable technique or combination of techniques to cause a portion of a program that has been identified as relevant to a user to be presented to the user. For example, process 300 can cause a user device 110 associated with the user to present the portion of the program without user intervention. In a more particular example, process 300 can cause set-top box 110 to tune to a channel that is being used to broadcast the program which process 300 has determined (e.g., at 310) is about to include a portion that is relevant to an entity associated with the user.

As another example, process 300 can cause a user device 110 associated with the user to prompt the user to cause the portion of the program to be presented. In a more particular example, process 300 can cause smart television 110 to present a user interface that informs a user that a relevant portion of a program has been recorded (or is about to be broadcast) and is available for presentation to the user. Such a user interface can, in some implementations, include instructions for the user to follow to cause the content to be presented by smart television 110 (e.g., instructions to press a particular button on a remote control to cause smart television 110 to present the portion of the program, instructions to press a particular button on a remote control to prevent smart television 110 from automatically presenting the portion of the program, instructions to tune to a particular channel, etc.).

In some cases, portions of multiple programs that are being broadcast may concurrently include portions relevant to the user. For example, if multiple baseball games are being broadcast simultaneously, a user may be associated with two baseball player entities that are at-bat at the same time. In some implementations, in such cases where process 300 determines that multiple programs that are being broadcast include portions relevant to the user at the same time (and/or while another relevant portion that has been recorded is being presented to the user), process 300 can queue multiple relevant portions for presentation to the user. As described below in connection with process 400 of FIG. 4, an order in which portions of programs that are recorded and/or queued for presentation are presented to the user can be prioritized based on any suitable factor or combination of factors. In some implementations, the number of portions that are queued at any given time can be limited based on any suitable factor or combination of factors. For example, the number of portions that can be queued can be limited to no more than a predetermined number of portions such as three relevant portions or programs, four relevant portions or programs, etc. As another example, the total amount of time of portions that can be queued can be limited to no more than a predetermined amount of time such as two minutes of content, three minutes of content, twenty minutes of content, etc.

In some implementations, in addition to or as an alternative to queueing content for presentation, process 300 (and/ or any other suitable process) can cause a representation (e.g., a still screen showing a representative scene from the portion) of multiple portions that have been determined to be relevant to a user to be presented to the user simultaneously, and can present one or more of the portions in response to user input selecting that portion. For example, a user can select a particular portion that is to be presented, and presentation of each other portion can be paused. In some implementations, as portions are selected and watched by the user or as portions become older than a threshold, portions can be replaced with newer and/or less relevant portions of programs.

In some implementations, process 300 can identify a default broadcast program that is to be presented using the user device based on user preferences. Process 300 can identify such a default broadcast program using any suitable technique or combination of techniques. For example, process 300 can use the user information received at 304 to determine which of the broadcasts is likely to include the largest number and/or longest duration of relevant portions based on the entities associated with the user and metadata indicating with which programs those entities are associated. As another example, process 300 can determine that a default program is the last program that was being presented, which may be a program that the user tuned to or a program that included a last relevant portion. As yet another example, process 300 can determine which program is a default program based on the interests of a user, which may be determined based on explicit input from the user and/or inferred from behavior attributed to the user. In a more particular example, in the case of a sports broadcast, process 300 can determine one or more teams whose games a user prefers to consume and a rank and/or order of those teams (if there is more than one team) and can set a default program based on which broadcast includes a team whose games the user most prefers to consume.

In some implementations, such a default broadcast program can be presented at times when a relevant portion identified by process 300 is not being presented and/or when no relevant portions are queued for presentation. Additionally or alternatively, in some implementations, a default broadcast program can be presented concurrently with a relevant portion at 314 when the relevant portion is not a portion of the default program that has already been presented to the user.

Figure 4:
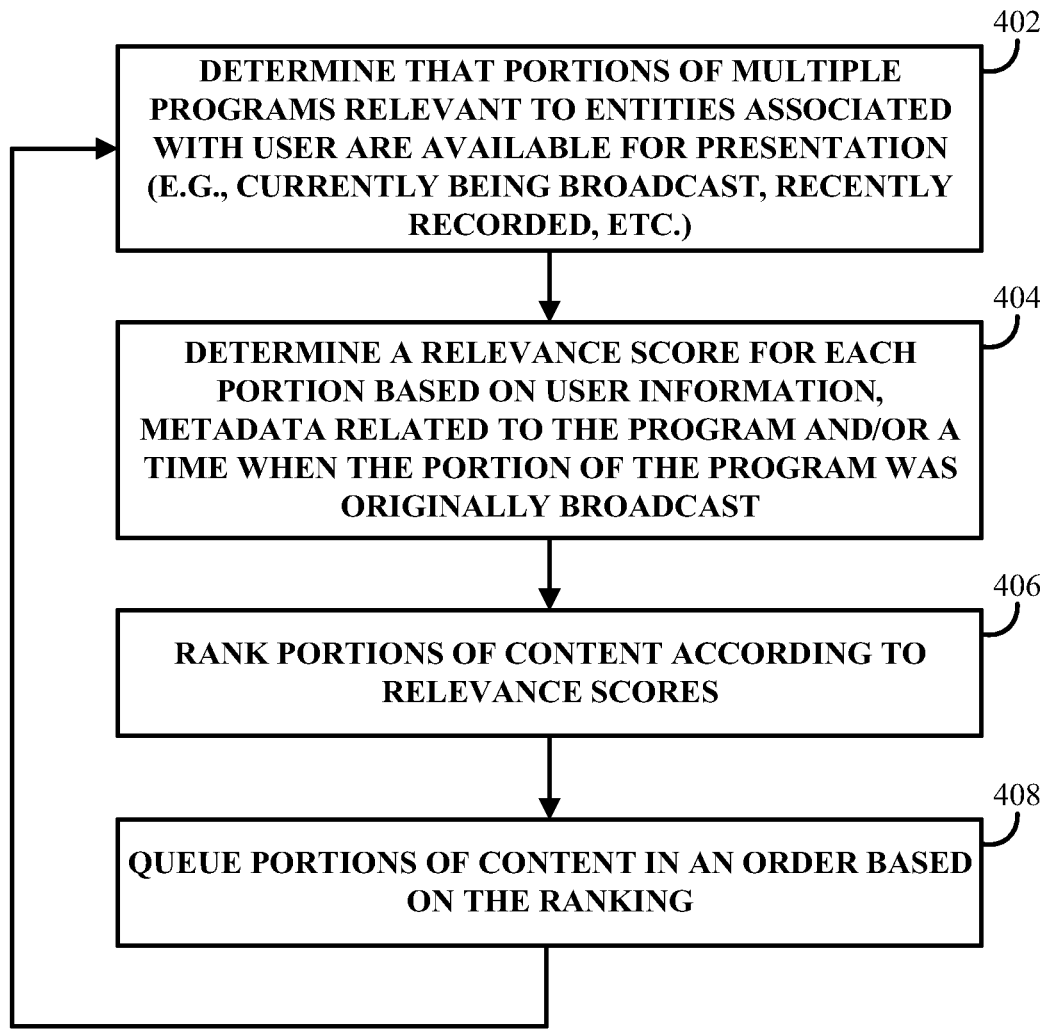
FIG. 4 shows an example of a process for queueing portions of content from multiple programs that are relevant to an entity associated with the user in accordance with some implementations of the disclosed subject matter.

FIG. 4 shows an example 400 of a process for queueing portions of content from multiple programs that are relevant to an entity associated with the user in accordance with some implementations of the disclosed subject matter. As shown in FIG. 4, at 402, process 400 can determine that multiple programs that are being broadcast and are available for presentation to the user each contain a portion that is relevant to an entity associated with the user. Process 400 can use any suitable technique or combination of technique to determine that multiple programs are being broadcast that each include portions relevant to an entity associated with the user. For example, at least a portion of process 300 can be used to identify one or more portions of a particular program that are relevant to one or more entities associated with the user. In such an example, at least a portion of process 300 can be executed in parallel and/or serially to identify portions of multiple programs that are each relevant to one or more entities associated with the user. In some implementations, at least the portion of process 300 can be executed by a computing device (e.g., server 120) that is also executing at least a portion of process 400 and/or is in communication with a computing device that is executing at least a portion of process 400. For example, process 300 can identify portions of programs that are relevant to an entity associated with the user and process 400 can determine an order in which the portions are to be presented to the user.

In some implementations, the multiple portions that are determined to be available at 402 can include portions from any suitable programs that are accessible to the user from any suitable source. For example, all portions that have been identified as being relevant and that have not yet been viewed by the user can be included in the multiple portions. As another example, as described above in connection with 312, the number of portions to be queued can be limited to no more than a predetermined number of portions, the total amount of time of portions to be queued can be limited to no more than a predetermined amount of time, etc.

At 404, process 400 can determine a relevance score for each of the multiple portions based on one or more of: user information; event metadata related to that portion of the program; timing information related to when that portion of the program was originally broadcast; and/or based on any other suitable factor or factors.

Process 400 can use any suitable technique or combination of techniques to determine a relevance score for a portion of content. For example, in some implementations, process 400 can determine a relevance score based on user information by determining which entities are relatively more important to a user and/or which entities are relatively less important to a user. This information can be used to increase a relevance score for an entity that is relatively more important to a user and/or decrease a relevance score for an entity that is relatively less important to a user. In a more particular example, if entities associated with a user are from a user's fantasy football team, players that are on the user's team can be deemed relatively more important and process 400 can consequently increase the relevance score of those players. In a related particular example, players that are on an opposing user's fantasy team may be deemed relatively less important, and process 400 can consequently decrease the relevance score of those players.

As another example, in some implementations, process 400 can determine a relevance score based on event metadata which can indicate the relative importance of a particular portion of a program with respect to one or more entities. In such an example, process 400 can determine the relative importance of a portion of the program to an entity associated with the user and increase a relevance score for a portion that is relatively more important and/or decrease a relevance score for a portion that is relatively less important. In a more particular example, event metadata can indicate that a particular play in a sporting event in which an entity associated with the user is participating is a relatively more important play compared to other plays, and can increase the relevance score for that play accordingly. In another more particular example, process 400 can receive event metadata indicating that a baseball player entity associated with the user is coming up to bat with two players on base in a baseball game that is being broadcast. In such an example, process 400 can determine that a portion of a program depicting the upcoming at-bat is relatively more important than if the batter were coming up with no players on base, and can increase the relevance score accordingly.

As yet another example, in some implementations, process 400 can determine a relevance score based on timing information associated with a particular portion of a program. In such an example, process 400 can increase a relevance score for a portion of a program that was broadcast relatively recently and/or that has not yet been broadcast, and can decrease a relevance score for a portion of a program that was broadcast less recently.

As still another example, in some implementations, process 400 can determine a relevance score based on user-specified preferences. In such an example, a user can provide input (e.g., using a user interface presented by user device 110) can specify which entities and/or which types of content are more or less important to the user and process 400 can adjust a relevance score according to the user's preferences.

As a further example, in some implementations, process 400 can determine a relevance score based on a potential impact that events depicted in the relevant portion may have on a fantasy sports team associated with the user. In such an example, process 400 can determine whether the events depicted in a particular portion of a program and/or events that may be depicted in a particular portion of a program (e.g., for events that have not yet happened, such as an upcoming at-bat) have the potential to (or do) change current situation of the fantasy sports team. In a more particular example, process 400 can determine whether the events would (or do) put the user ahead in a head-to-head matchup, put the user behind in the head-to-head matchup, change the user's position in a particular category (thus changing the amount of points the user receives for that category), and/or any other suitable change in situation of the user's fantasy sports team. Additionally or alternatively, process 400 can determine the relevance score based on the relative value of the events depicted in a particular portion of a program and/or events that may be depicted in a particular portion of a program (e.g., for events that have not yet happened, such as an upcoming at-bat). For example, process 400 can determine that the relative value of a home run is higher than the relative value of a strike-out based on the user's circumstances (or that a touchdown catch is more valuable than a touchdown pass, or any other suitable situation), and can thus determine that the relevance score of a portion of a program depicting an at-bat for a batter on the user's team is higher than the relevance score of a portion of a program depicting a pitcher on the user's team facing a batter.

In some implementations, process 400 can determine a relevance score based, in part, on a source of the broadcast content. For example, user information (such as implied or expressed preferences) can indicate that a user is more interested in content from certain content providers, such as certain broadcast networks, providers of audio and/or video on an audio and/or video hosting service, and/or any other source of content. In a more particular example, the relevance score for a portion of a broadcast program from a first channel accessible to a user device from a cable television provider that a user has expressed a preference for can be weighted to indicate that the portion is more relevant than a portion from a second channel that would otherwise receive a similar relevance score (e.g., if both portions are relevant to the same entity and are being broadcast at the same time).

In some implementations, process 400 can normalize relevance scores such that the relevance scores for different types of content can be compared to each other. For example, process 400 can determine and/or receive a maximum relevance score for any particular type of content (e.g., football game content, baseball game content, new content, etc.), and can compare a calculated relevance score to the maximum score to calculate a normalized relevance score.

In some implementations, process 400 can adjust a relevance score for portions from the same program so that the portions are closer together in ranking. For example, the multiple portions of programs can include three portions of programs with a first portion of a first program depicting a first baseball game has a relatively high relevance score, a portion of a second program depicting a second baseball game has a lower relevance score, and a second portion of the first program having a relevance score that is lower still. In such an example, process 400 can increase a relevance score of the second portion of the first program and/or decrease the relevance score of the first portion of the first program such that the relevance score of the portion of the second program does not fall between the relevance scores of the first and second portions of the first program.

At 406, process 400 can rank and/or order the portions of content from the multiple programs based at least in part on the relevance scores. For example, process 400 can rank and/or order the portions such that a first portion having a highest relevance score is ranked first and/or placed in a first spot in an order, a second portion having a second highest relevance score is ranked second and/or placed in a second spot in an order, and so on. In some implementations, process 400 can adjust the ranking and/or ordering of the portions such that the portions are placed consecutively in the queue (e.g., portions of the same program can be grouped). Additionally, in some implementations, process 400 can adjust the ranking and/or ordering of the portions such that an earlier portion of a program is not presented after a later portion of the same program (e.g., process 400 can adjust the rankings to present earlier occurring events before later occurring events in the same program). In some implementations, such adjustments can be made in spite of a relevance score of the adjusted portions being lower than the relevance score of portions of other programs.

Note that although ranking and/or ordering is described as ranking by placing a highest relevance score first, this is merely an example, and ranking and/or ordering can be performed using any suitable technique such that portions that are determined to be more relevant are queued for presentation prior to portions that are determined to be less relevant.

At 408, process 400 can queue at least some of the portions of content from the multiple programs based at least in part on the ranking and/or ordering of the portions of the program. As described above in connection with 406, process 400 can adjust the queue such that portions of the same program are presented in time series and/or are grouped, in addition to, or as an alternative to performing such adjustment as part of 404 and/or 406. In some implementations, after queueing the content at 408, process 400 can return to 402 and continue to determine whether multiple portions are present.

In some implementations, process 400 can create more than one queue for portions of programs relating to different groups of entities. For example, process 400 can create a first queue for portions of programs relating to baseball, a second queue for portions of programs relating to football, and a third queue for portions of programs relating to current events related to one or more entities associated with the user. As another example, process 400 can create a first queue for portions of programs relating to a first fantasy baseball team associated with the user, and can create a second queue for portions of programs relating to a second fantasy baseball team associated with the user. In some implementations, such multiple queues can facilitate presentation of portions of programs related to similar entities to a user. Additionally, in some implementations, if process 400 creates multiple queues, process 400 can also create a master queue that includes the portions of programs from all queues associated with the user.

In some implementations, process 400 can determine a number of tuners that are available for presenting and/or recording broadcasts and/or portions of broadcasts based on user information. For example, process 400 can determine that a particular user device 110 (e.g., a set-top box) has six tuners that can be used to receive broadcasts that are to be presented and/or recorded. Process 400 can use any suitable information to determine the number of tuners that a particular user device 110 includes, such as information identifying a model and/or brand of the user device, information from a user indicating a number of tuners that a user device includes, information communicated from the user device indicating the number of tuners included in the user device, and/or any other suitable information. Additionally, in some implementations, process 400 can determine whether one or more of the tuners included in a user device are unavailable (e.g., because the one or more tuners are reserved for other purposes, because the one or more tuners are currently being used for other purposes, etc.).

In some implementations, process 400 can use the ranking of the portions of content and the number of available tuners to determine which portions of content to queue for presentation and/or recording at 408. For example, process 400 can determine that user device 110 has two tuners available to present and/or record content, and accordingly can determine that a maximum of two portions of broadcasts can be recorded and/or presented at any given time. In such an example, process 400 can prioritize the portions such that a maximum of two most relevant portions are queued in a queue of portions of broadcasts that are to be presented and/or recorded from the broadcasts using tuners of user device 110.

Additionally, in some implementations, process 400 can determine a relevance score for and/or rank broadcasts (and/or portions of broadcasts) that have not yet been broadcast based on similar information to the information that is used to rank portions of broadcasts as they are broadcast. For example, process 400 can determine relevance scores for programs that are scheduled to be broadcast that are determined to be relevant to one or more entities associated with the user (e.g., as described above in connection with 308). In some implementations, such relevance scores can be similar to relevance scores determined at 404 for portions of broadcasts and can reflect a likelihood that the broadcast will include one or more portions relevant to an entity associated with a user. For example, process 400 can determine a relevance score for a broadcast based on the number of entities associated with the user that are likely to be included in the content of the broadcast, based on projected scores for players that are on teams that are participating in a sporting event that is to be depicted in the broadcast, and/or based on any other suitable information. In some implementations, process 400 can use the number of tuners that are available and the relevance scores to determine which broadcasts to record at any particular time during the broadcast. In such implementations, the number of tuners that are available can change throughout the course of a broadcast (e.g., based on other broadcasts that have previously been set to record at the time when the broadcast is scheduled to air, based on user actions during the broadcast, etc.).

In some implementations, if a portion of a program that was not presented and/or recorded because there was not an available tuner has a relatively high relevance score, such a portion can be requested and/or retrieved from any suitable source of content. In such implementations, process 400 can queue portions of content that were not recorded and/or cannot be presented because a tuner is not available with information indicating that the portion is to be requested from a particular source of content. Additionally, in some implementations, process 400 can associate instructions for requesting and/or retrieving a portion that was queued but not recorded and/or presented that can be used (e.g., by user device 110, by server 120, etc.) to request and/or retrieve the content from the particular source of content. For example, process 400 can include identifying information of the portion of the broadcast and/or identifying information of a source from which the portion of the broadcast can be requested and/or retrieved. In such an example, the source can be any suitable source such as a video on-demand server, a cable headend, and Internet-based provider of content, etc. In some implementations, a user device that is used to request and/or receive the portion of the broadcast that was queued but not recorded and/or presented can be the same or different from user device 110 that includes tuners used to record and/or present other queued portions of one or more broadcasts.

In some implementations, the mechanisms described herein can dynamically create a broadcast that is based on a user's interests from multiple broadcasts provided by a broadcast source. In such implementations, the broadcast source can provide metadata prior to the broadcast and/or during the broadcast that can facilitate the mechanisms described herein in dynamically creating such a broadcast. For example, a broadcaster of a news program that is allocated thirty minutes of programming time can provide additional content (e.g., on one or more separate channels, as one or more additional streams of content, etc.), and metadata related to the additional content. In such an example, the news program can be broadcast as a traditional thirty minute news program that is divided into segments related to various topics, and the additional content may or may not be related to the subject matter in the segments that are included in the traditional broadcast. The mechanisms described herein can use this metadata to determine, based on entities associated with the user, which of the segments to include in the broadcast dynamically created for the user. These segments can be queued and/or ordered using any suitable technique or combination of techniques.

Figure 5:
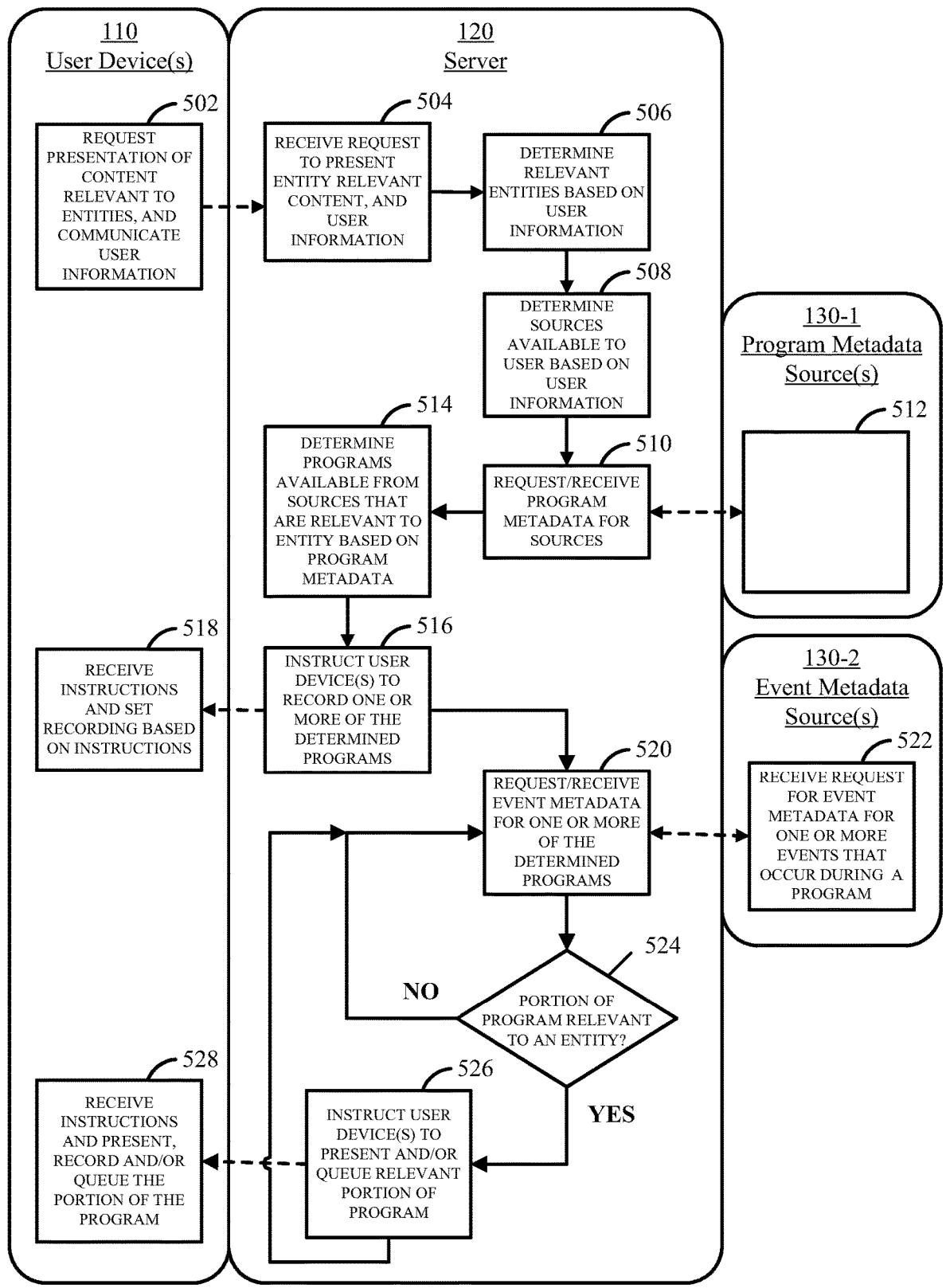
FIG. 5 shows an example of a data flow that can be used in conjunction with the processes of FIGS. 3 and/or 4 to selectively present broadcast content based on user interests in accordance with some implementations of the disclosed subject matter.

FIG. 5 shows an example 500 of a data flow that can be used in conjunction with the processes of FIGS. 3 and/or 4 to selectively present broadcast content based on user interests in accordance with some implementations of the disclosed subject matter.

At 502, user device 110 can transmit a request for selective presentation of content relevant to entities to server 120 and/or user device 110 can communicate user information to server 120. User device 110 can use any suitable technique or combination of techniques to transmit such a request and/or user information, the request and/or user information can be formatted in any suitable manner and can include any suitable information. For example, such a request and/or user information can be similar to the request described above in connection with 302 of FIG. 3.

At 504, server 120 can receive the request to present content relevant to entities associated with the user, and/or can receive user information associated with the user. Server 120 can use any suitable technique or combination of techniques to receive such a request and/or user information, and as described above in connection with 302 of FIG. 3 the request and/or user information can be formatted in any suitable manner and can include any suitable information.

At 506, server 120 can determine entities that are relevant to the user based on the received user information and/or any other suitable information. Server 120 can use any suitable technique or combination of techniques to determine entities associated with the user, such as techniques described above in connection with 304 of FIG. 3.

At 508, server 120 can determine sources of content that are available to the user based on the user information. Server 120 can use any suitable technique or combination of techniques to determine which sources of content are available to the user, such as techniques described above in connection with 306 of FIG. 3. In some implementations, 508 can be omitted, such as in cases where server 120 is associated with a particular service that is the only source of content that is to be considered when determining which portions of programs are relevant to the user, and/or where server 120 has previously determined which sources of content are available to the user.

At 510, server 120 can request and/or receive program metadata for one or more sources that are determined to be available at 508. Server 120 can use any suitable technique or combination of techniques to request and/or receive such program metadata, such as techniques described above in connection with 306 of FIG. 3. In some implementations, server 120 can request and/or receive the program metadata from one or more metadata sources, such as a program metadata source 130-1, which in 500 is associated with a cable television provider. Additionally, in some implementations, server 120 can receive and/or request program metadata from other metadata sources 130 (not shown in FIG. 5). Such program metadata can be formatted in any suitable manner and can be communicated to server 120 using any suitable technique or combination of techniques.

In some implementations, server 120 can request and/or receive program metadata at any suitable timing, which can recur at regular and/or irregular times (e.g., when updated program metadata is available, when newly created metadata is available, when currently stored metadata has expired, etc.) and/or can be performed on an as-needed basis. Additionally, in some implementations, server 120 and/or another server (not shown) that is associated with server 120 can store received metadata for later user, and this stored metadata can be accessed as needed (e.g., to determine which programs are available to a user).

At 512, program metadata source 130-1 can receive the request for program metadata from server 120, and/or can provide requested program metadata to server 120. In some implementations, rather than responding to a request for metadata related to specific sources of content, metadata source 130-1 can transmit metadata related to any and/or all programs for which metadata source 130-1 has metadata.

At 514, server 120 can identify which programs that are currently being broadcast among programs that are available to the user are relevant to one or more of the entities associated with the user. Server 120 can use any suitable technique or combination of techniques to identify programs that are relevant to the user, such as techniques described above in connection with 308 of FIG. 3. In some implementations, as described above in connection with 308 of FIG. 3, these programs can include programs that are currently being broadcast and/or programs that are scheduled to be broadcast in the future (which can include any suitable period of time in the future).

At 516, server 120 can instruct user device 110 (and/or any other suitable user device or user devices) to record one or more of the programs determined at 514 to be relevant to one or more entities associated with the user. In some implementations, whether a user device is instructed to record the one or more programs can be determined based on whether there are multiple programs occurring at the same time and/or whether the subject of the one or more program is unpredictable (e.g., such as when the subject of the program is a football game). In some implementations, server 120 can instruct user device 110 to record content from any suitable source, such as an over-the-air television broadcaster, an Internet-based source of broadcast content, a television broadcast by a telephone service operator, etc. In some implementations, the number of programs that server 120 instructs user device 110 to record can be based on capabilities of user device 110 and/or programs that have previously been scheduled to record (e.g., based the number of programs that user device 110 is capable of recording), which can be communicated as part of user information at, for example, 502. In such implementations, server 120 can determine which programs are likely to be more relevant to the user (e.g., based on the importance to the user of the entities in the program, based on the number of entities associated with the user that are in the program, etc.), and instruct user device 110 to record a subset of the most relevant programs.

At 518, user device 110 can receive the instructions to record one or more programs, and can set and/or start recording of the programs based on the instructions. In some implementations, user device 110 can determine which programs are likely to be more relevant to the user (e.g., based on the importance to the user of the entities in the program, based on the number of entities associated with the user that are in the program, etc.) based on any suitable factor or factors. Additionally or alternatively, user device 110 can query a user to prompt the user to select which programs, if any, to record.

At 520, server 120 can request and/or receive event metadata related to the content of one or more of the programs that were determined to be relevant to an entity associated with the user. Server 120 can use any suitable technique or combination of techniques to request and/or receive such event metadata, such as techniques described above in connection with 310 of FIG. 3. In some implementations, server 120 can request and/or receive the event metadata from one or more metadata sources, such as event metadata source 130-2. Additionally, in some implementations, server 120 can receive and/or request event metadata from other metadata sources 130 (not shown in FIG. 5), which may be related to different programs than the event metadata received from event metadata source 130-2. Such event metadata can be formatted in any suitable manner and can be communicated to server 120 using any suitable technique or combination of techniques.

In some implementations, server 120 can request and/or receive event metadata at any suitable timing, which can recur on a regular or irregular schedule (e.g., when updated event metadata is available, when newly created event metadata is available, etc.) and/or can be performed on an as-needed basis. Additionally, in some implementations, server 120 and/or another server (not shown) that is associated with server 120 can store received metadata for later user, and this stored metadata can be accessed as needed.

At 522, event metadata source 130-2 can receive the request for event metadata from server 120, and can provide requested event metadata to server 120. In some implementations, event metadata source 130-2 can provide any and/or all metadata related to a particular topic to server 120, rather than merely event metadata that was requested. For example, if event metadata source 130-2 provides event metadata for professional baseball games, event metadata source 130-2 can provide metadata for games that are currently ongoing, rather than providing metadata related to only games for which metadata has been requested.

In some implementations, event metadata can be provided from another metadata source, such as metadata source 130-1 and/or a content source 140 (not shown in FIG. 5). For example, for certain programs that are not being broadcast as they are recorded, event metadata can be included and/or derived from program metadata. As another example, event metadata can be included in a content stream that includes the program. In such an example, server 120 can receive the content stream and extract the event metadata and/or the event metadata can be extracted by user device 110 and communicated to server 120.

At 524, server 120 can determine whether a portion of a program that is about to be broadcast, is currently being broadcast, and/or that has recently been broadcast, is relevant to an entity associated with the user based on the event metadata. Server 120 can use any suitable technique or combination of techniques to determine whether a portion of a program is relevant to a user, such as techniques described above in connection with 310 of FIG. 3.

If a portion of a program is not relevant to an entity associated with the user ("NO" at 524), server 120 can return to 520 and can continue to receive event metadata and determine which programs that are being broadcast and/or are scheduled to be broadcast are relevant to the user and determining whether one or more portions of such programs are relevant to a particular entity.

Otherwise, if a portion of a program is relevant to an entity associated with the user ("YES" at 524), server 120 can proceed to 526. At 526, server 120 can instruct user device 110 to present the program, can instruct user device 110 to record the portion of the program that is relevant to the entity, and/or can instruct user device 110 to queue the relevant portion of the program. Server 120 can use any suitable technique or combination of techniques to instruct user device 110 to perform an action, such as techniques described above in connection with 314 of FIG. 3.

At 528, user device 110 can receive the instructions and can present, record and/or queue the portion of the program identified by server 120 based on the instructions.

In some implementations, after instructing user device 110 to take a particular action, server 120 can return to 520 and continue to receive event metadata. Additionally or alternatively, server 120 can return to any other suitable portion of flow 500 to perform any other suitable action, such as by returning to 514 to determine which programs are available to the user.

Note that, although flow 500 is described with reference to server 120 performing actions 502-510, 514, 516 and 520-526, these actions can be performed by multiple servers and/or some or all of these actions can be performed by another device, such as user device 110 and/or a content source 140. Additionally or alternatively, server 120 can be a content source (e.g., content source 140) for particular programs, that also determines which of the particular programs and/or which portions of those programs are relevant to the user. In such an example, such a server 120/content source 140 can determine which content is transmitted to and/or presented by user device 110, rather than causing user device 110 to change which content is being presented. In some implementations, server 120 can record content from a content source (e.g., in addition to or in lieu of user device 110 recording content as described in connection with 518 of FIG. 5). In such implementations, server 120 can act as a content source for user device 110 that can determine which content is transmitted to and/or presented by user device 110 and/or can cause user device 110 to change which content is being presented (e.g., by causing user device 110 to request a different portion of content from server 120).

In some implementations, the mechanisms described herein can include software, firmware, hardware, or any suitable combination thereof. For example, the mechanisms described herein can encompass a computer program written in a programming language recognizable by one or more of hardware processors 212, 222 and 232 (e.g., a program written in a programming language, such as, Java, C, Objective-C, C++, C #, Javascript, Visual Basic, or any other suitable approaches). As another example, the mechanisms described herein can encompass code corresponding to one or more Web pages or Web page portions (e.g., via any suitable encoding, such as Hyper Text Markup Language ("HTML"), Dynamic Hyper Text Markup Language ("DHTML"), Extensible Markup Language ("XML"), Java-Server Pages ("JSP"), Active Server Pages ("ASP"), Cold Fusion, or any other suitable approaches).

In some implementations, any suitable computer readable media can be used for storing instructions for performing the functions and/or processes described herein. For example, in some implementations, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

It should be understood that the above described steps of the processes described above in connection with FIGS. 3-5 can be executed or performed in any order or sequence not limited to the order and sequence shown and described in the figures. Also, some of the above steps of the processes described above in connection with FIGS. 3-5 can be executed or performed substantially simultaneously where appropriate or in parallel to reduce latency and processing times.

It should also be noted that, as used herein, the term mechanism can encompass hardware, software, firmware, or any suitable combination thereof.

Accordingly, methods, systems, and media for selectively presenting broadcast content based on user interests are provided.

Although the invention has been described and illustrated in the foregoing illustrative implementations, it is understood that the present disclosure has been made only by way of example, and that numerous changes in the details of implementation of the invention can be made without departing from the spirit and scope of the invention. Features of the disclosed implementations can be combined and rearranged in various ways.

What is claimed is:

1. A method for selectively presenting media content, the method comprising:
   associating, using a hardware processor, a plurality of entities of interest with a user account of a user device based on user information associated with the user account,
   determining that a portion of a live media content item is relevant to at least one of the plurality of entities of interest;
   in response to determining that the portion of the live media content item is relevant to at least one of the plurality of entities of interest, placing a representation of the portion of the live media content item in a queue that is ordered based on relevance to the plurality of entities of interest;
   causing the user device to present the representation of the portion of the live media content item according to the order of the queue; and
   in response to receiving a user input from the representation of the portion of the live media content item, causing the user device to present the portion of the live media content item on the user device.

2. The method of claim 1, further comprising determining that the live media content item is relevant to at least one of the plurality of entities of interest based on content metadata corresponding to the live media content item.

3. The method of claim 1, wherein the live media content item is a first live media content item,
   the method further comprising receiving event metadata for first live media content item,
   wherein each of the plurality of entities of interest corresponds to one or more persons on a roster of a particular team that is a member of a sports organization,
   wherein the live media content item depicts a game between teams that are members of the sports organization, and
   wherein event metadata is indicative of events in the game depicted by the live media content item.

4. The method of claim 3, further comprising:
   transmitting instructions to the user device to record the first live media content item;
   determining, during a presentation of a second live media content item, that a portion of the second live media content item is relevant to a second entity of the plurality of entities of interest based on the received event metadata indicative of events in the game depicted in the second live media content item; and
   in response to determining that the portion of the second live media content item is relevant to the second entity, causing the user device to present the portion of the second live media content item by instructing the user device to play back the portion of the second live media content item from a recording of the second live media content item without user intervention.

5. The method of claim 3, wherein the user information includes information indicating that the user account is associated with a fantasy sports team related to a sport organization, and
   wherein associating the plurality of entities of interest with the user account comprises associating players that are on the roster of the fantasy sports team with the user account.

6. The method of claim 5, wherein the event metadata is metadata describing a course of a baseball game, depicted in the first live media content item, between two teams that are members of the sports organization,
   wherein a first entity is a player participating in the game,
   wherein determining that the portion of the first live media content item is relevant to the first entity comprises determining that the first entity is scheduled to bat in the portion of the first live media content item based on the event metadata,
   wherein the method further comprises determining a time at which the first entity is likely to appear in the first live media content item based on the event metadata, and
   wherein causing the user device to present the portion of the first live media content item comprises transmitting, at a time prior to the time when the portion is to be presented, instructions to the user device to present the first live media content item.

7. The method of claim 3, wherein the event metadata is metadata describing a course of the game, depicted in a second live media content item, between two teams that are members of the sports organization,
   wherein a second entity is a first player participating in the game,
   wherein determining that the portion of the second live media content item is relevant to the second entity comprises determining that the second entity contributed to a play depicted by the portion of the second live media content item based on the event metadata, and
   wherein the method further comprises determining a time in the second live media content item corresponding to the play based on the event metadata.

8. The method of claim 1, further comprising placing, using the hardware processor, the representation of the portion of the live media content item in the queue without intervention from a user of the user device.

9. A system for selectively presenting media content, the system comprising:
   a hardware processor that:
      associates a plurality of entities of interest with a user account of a user device based on user information associated with the user account;
      determines that a portion of at least one live media content item is relevant to at least one of the plurality of entities of interest;
      in response to determining that the portion of at least one live media content item is relevant to at least one of the plurality of entities of interest, places a representation of the portion of at least one live media content item in a queue that is ordered based on relevance to the plurality of entities of interest;
      causes the user device to present the representation of the portion of at least one live media content item according to the order of the queue; and
      in response to receiving a user input from the representation of the portion of at least one live media content item, causes the user device to present the portion of at least one live media content item on the user device.

10. The system of claim 9, wherein the hardware processor further determines that the at least one live media content item is relevant to at least one of the plurality of entities of interest based on content metadata corresponding to each of the at least one live media content item.

11. The system of claim 9, wherein the hardware processor further receives event metadata for a first live media content item of the at least one live media content item,
    wherein each of the plurality of entities of interest corresponds to one or more persons on a roster of a particular team that is a member of a sports organization,
    wherein the first live media content item depicts a game between teams that are members of the sports organization, and
    wherein event metadata is indicative of events in the game depicted by the first live media content item.

12. The system of claim 11, wherein the hardware processor further:
    transmits instructions to the user device to record the first live media content item;
    determines, during a presentation of a second live media content item of the at least one live media content item, that a portion of the second live media content item is relevant to a second entity of the plurality of entities based on the event metadata indicative of events in the game depicted in the second live media content item; and
    in response to determining that the portion of the second live media content item is relevant to the second entity, causes the user device to present the portion of the second live media content item by instructing the user device to play back the portion of the second live media content item from a recording of the second live media content item without user intervention.

13. The system of claim 11, wherein the user information includes information indicating that the user account is associated with a fantasy sports team related to a sport organization, and
    wherein associating the plurality of entities of interest with the user account comprises associating players that are on the roster of the fantasy sports team with the user account.

14. The system of claim 13, wherein the event metadata is metadata describing a course of a baseball game, depicted in the first live media content item, between two teams that are members of the sports organization,
    wherein a first entity is a player participating in the game,
    wherein determining that the portion of at least one live media content item is relevant to the first entity comprises determining that the first entity is scheduled to bat in the portion of at least one live media content item based on the event metadata,
    wherein the hardware processor further determines a time at which the first entity is likely to appear in the first live media content item based on the event metadata, and
    wherein causing the user device to present the portion of the first live media content item comprises transmitting, at a time prior to the time when the portion is to be presented, instructions to the user device to present the first live media content item.

15. The system of claim 11, wherein the event metadata is metadata describing a course of the game, depicted in a second live media content item, between two teams that are members of the sports organization,
    wherein a second entity is a first player participating in the game,
    wherein determining that the portion of the second live media content item is relevant to the second entity comprises determining that the second entity contributed to a play depicted by the portion of the second live media content item based on the event metadata, and
    wherein the hardware processor further determines a time in the second live media content item corresponding to the play based on the event metadata.

16. The system of claim 9, wherein the hardware processor further places the representation of the portion of at least one live media content item in queue without intervention from a user of the user device.

17. A non-transitory computer-readable medium containing computer executable instructions that, when executed by a processor, cause the processor to perform method for selectively presenting media content, the method comprising:
    associating a plurality of entities of interest with a user account of a user device based on user information associated with the user account,
    determining that a portion of one or more live media content items is relevant to at least one of the plurality of entities of interest;
    in response to determining that the portion of one or more live media content items is relevant to at least one of the plurality of entities of interest, placing a representation of the portion of one or more live media content items in a queue that is ordered based on relevance to the plurality of entities of interest;
    causing the user device to present the representation of the portion of one or more live media content items according to the order of the queue; and
    in response to receiving a user input from the representation of the portion of one or more live media content items, causing the user device to present the portion of one or more live media content items on the user device.

* * * * *

UNITED STATES PATENT AND TRADEMARK OFFICE
CERTIFICATE OF CORRECTION

PATENT NO. : 12,225,244 B2
APPLICATION NO. : 18/233490
DATED : February 11, 2025
INVENTOR(S) : Diamondstein Page 1 of 1

It is certified that error appears in the above-identified patent and that said Letters Patent is hereby corrected as shown below:

In the Claims

In Column 29, Claim 1, Line 15, delete "account," and insert -- account; --, therefor.

In Column 32, Claim 17, Line 34, delete "account," and insert -- account; --, therefor.

Signed and Sealed this
First Day of April, 2025

Coke Morgan Stewart
*Acting Director of the United States Patent and Trademark Office*